(12) United States Patent
Gu et al.

(10) Patent No.: US 11,177,533 B2
(45) Date of Patent: Nov. 16, 2021

(54) SEPARATOR AND ELECTROCHEMICAL DEVICE INCLUDING THE SAME

(71) Applicant: LG CHEM, LTD., Seoul (KR)

(72) Inventors: Min-Ji Gu, Daejeon (KR); Dong-Wook Sung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 237 days.

(21) Appl. No.: 15/774,381

(22) PCT Filed: Jun. 8, 2017

(86) PCT No.: PCT/KR2017/005976
§ 371 (c)(1),
(2) Date: May 8, 2018

(87) PCT Pub. No.: WO2017/213443
PCT Pub. Date: Dec. 14, 2017

(65) Prior Publication Data
US 2019/0260001 A1 Aug. 22, 2019

(30) Foreign Application Priority Data
Jun. 8, 2016 (KR) .................. 10-2016-0070733

(51) Int. Cl.
*H01M 50/411* (2021.01)
*H01M 10/0525* (2010.01)
*H01M 10/052* (2010.01)
*H01M 50/446* (2021.01)
*H01M 50/449* (2021.01)

(52) U.S. Cl.
CPC ....... *H01M 50/411* (2021.01); *H01M 10/052* (2013.01); *H01M 10/0525* (2013.01); *H01M 50/446* (2021.01); *H01M 50/449* (2021.01)

(58) Field of Classification Search
None
See application file for complete search history.

(56) References Cited

U.S. PATENT DOCUMENTS

| 2011/0143185 A1 | 6/2011 | Nishikawa |
| 2013/0004817 A1 | 1/2013 | Lee et al. |
| 2013/0149587 A1 | 6/2013 | Yu et al. |
| 2013/0224555 A1* | 8/2013 | Hong ............. H01M 2/166 429/144 |
| 2014/0154583 A1 | 6/2014 | Ueki et al. |
| 2014/0272534 A1 | 9/2014 | Ueki et al. |
| 2015/0004464 A1 | 1/2015 | Okuno et al. |
| 2015/0221917 A1 | 8/2015 | Sakamoto et al. |
| 2015/0333311 A1 | 11/2015 | Kim et al. |
| 2016/0049628 A1* | 2/2016 | Kim ............. H01M 2/1653 29/623.5 |
| 2017/0244086 A1 | 8/2017 | Umeyama et al. |

FOREIGN PATENT DOCUMENTS

| CN | 102931369 A | 2/2013 |
| CN | 104064707 A | 9/2014 |
| JP | 2008-210541 A | 9/2008 |
| JP | 2010-92881 A | 4/2010 |
| JP | 2014-511554 A | 5/2014 |
| JP | 2014-180821 A | 9/2014 |
| JP | 2016-510267 A | 4/2016 |
| JP | 2016-76492 A | 5/2016 |
| KR | 10-2013-0070170 A | 6/2013 |
| KR | 10-2013-0123568 A | 11/2013 |
| KR | 10-2015-0015918 A | 2/2015 |
| KR | 10-1515357 B1 | 4/2015 |
| KR | 10-2015-0050060 A | 5/2015 |
| KR | 10-2016-0020283 A | 2/2016 |
| WO | WO 2013/108511 A1 | 7/2013 |
| WO | WO 2015/097953 A1 | 7/2015 |
| WO | WO 2016/059466 A1 | 4/2016 |

OTHER PUBLICATIONS

Kim et al. (Kim 2) (KR 10-2015-0050060) (a raw machine translation) (Abstract) (May 8, 2015) (Year: 2015).*
Kim et al. (Kim 2) (KR 10-2015-0050060) (a raw machine translation) (Detailed Description) (May 8, 2015) (Year: 2015).*
Kim et al. (Kim 2) (KR 10-2015-0050060) (a raw machine translation) (Claims) (May 8, 2015) (Year: 2015).*
English translation of the Written Opinion of the International Searching Authority (Form PCT/ISA/237) for International Application No. PCT/KR2017/005976, dated Sep. 20, 2017.
International Search Report for PCT/KR2017/005976 dated Sep. 20, 2017.

* cited by examiner

*Primary Examiner* — Carmen V Lyles-Irving
(74) *Attorney, Agent, or Firm* — Birch, Stewart, Kolasch & Birch, LLP

(57) ABSTRACT

Disclosed are a separator and an electrochemical device including the same. The separator includes: a porous substrate having a plurality of pores; and a pair of porous coating layers formed on both surfaces of the porous substrate, and including a plurality of inorganic particles and a binder polymer disposed partially or totally on the surface of the inorganic particles to connect and fix the inorganic particles with each other, wherein the amount of the binder polymer and the amount of the inorganic particles in one porous coating layer are the same as those in the other porous coating layer, the binder polymer is used in an amount of 5-40 wt % based on the total weight of the porous coating layer, the inorganic particles include boehmite particles and non-boehmite particles, and the boehmite particles and the binder polymer are used at a weight ratio of 1:1-1:5.

9 Claims, No Drawings

SEPARATOR AND ELECTROCHEMICAL DEVICE INCLUDING THE SAME

TECHNICAL FIELD

The present disclosure relates to a separator and an electrochemical device including the same. Particularly, the present disclosure relates to a separator having improved heat shrinking property and an electrochemical device including the same.

The present application claims priority to Korean Patent Application No. 10-2016-0070733 filed on Jun. 8, 2016 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher driving voltage and significantly higher energy density as compared to conventional batteries, such as Ni-MH, Ni—Cd and sulfuric acid-lead batteries using an aqueous electrolyte. However, such lithium ion batteries have a problem of ignition and explosion caused by the use of an organic electrolyte and a disadvantage of a difficulty in manufacture.

Recent lithium ion polymer batteries improve such a problem and disadvantage of lithium ion batteries and are expected as one of the next-generation batteries. However, such lithium ion polymer batteries still have a relatively low capacity as compared to lithium ion batteries and particularly show an insufficient discharge capacity at low temperature. Thus, there is an imminent need for improving this.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator having a porous organic-inorganic coating layer formed by applying a mixture of an excessive amount of inorganic particles and a binder polymer onto at least one surface of a porous substrate having a plurality of pores.

DISCLOSURE

Technical Problem

The present disclosure is designed to solve the problems of the related art, and therefore the present disclosure is directed to providing a separator which shows minimized heat shrinking and ensures safety.

The present disclosure is also directed to providing an electrochemical device including the separator.

Technical Solution

In one aspect of the present disclosure, there is provided the separators according to the following embodiments.

According to a first embodiment, there is provided a separator including:

a porous substrate having a plurality of pores; and a pair of porous coating layers formed on both surfaces of the porous substrate, and including a plurality of inorganic particles and a binder polymer disposed partially or totally on the surface of the inorganic particles to connect and fix the inorganic particles with each other, wherein the amount of the binder polymer and the amount of the inorganic particles in one porous coating layer are the same as those in the other porous coating layer, the binder polymer is used in an amount of 5-40 wt % based on the total weight of the porous coating layer, the inorganic particles include boehmite particles and non-boehmite particles, and the boehmite particles and the binder polymer are used at a weight ratio of 1:1-1:5.

According to a second embodiment, there is provided the separator of the first embodiment, wherein the boehmite particles and non-boehmite particles are used at a weight ratio of 1:99-99:1.

According to a third embodiment, there is provided the separator of the first or second embodiment, wherein the non-boehmite particles include inorganic particles having a dielectric constant of 5 or more, inorganic particles capable of transporting lithium ions or a mixture thereof.

According to a fourth embodiment, there is provided the separator of the third embodiment, wherein the inorganic particles having a dielectric constant of 5 or more include $BaTiO_3$, $Pb(Zr,Ti)O_3$ (PZT), $Pb_{1-x}La_xZr_{1-y}Ti_yO_3$ (PLZT), $PB(Mg_{3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC or a mixture thereof.

According to a fifth embodiment, there is provided the separator of the third embodiment, wherein the inorganic particles capable of transporting lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$), $P_2S_5$-based glass ($Li_xP_yS_z$, $0<x<3$, $0<y<3$, $0<z<7$) or a mixture thereof.

According to a sixth embodiment, there is provided the separator of any one of the first embodiment to the fifth embodiment, wherein the boehmite particles have an average particle diameter 0.01-0.9 times higher than the average particle diameter of the non-boehmite particles.

According to a seventh embodiment, there is provided the separator of any one of the first embodiment to the sixth embodiment, wherein the non-boehmite particles have an average particle diameter of 0.5-3 μm.

According to an eighth embodiment, there is provided the separator of any one of the first embodiment to the seventh embodiment, wherein the boehmite particles have an average particle diameter of 0.05-0.4 μm.

According to a ninth embodiment, there is provided the separator of any one of the first embodiment to the eighth embodiment, wherein the porous substrate is a polyolefin-based porous substrate.

According to a tenth embodiment, there is provided the separator of the ninth embodiment, wherein the polyolefin-based porous substrate includes any one polymer selected from the group consisting of polyethylene, polypropylene, polybutylene and polypentene, or a combination thereof.

According to an eleventh embodiment, there is provided the separator of any one of the first embodiment to the tenth embodiment, wherein the porous substrate has a thickness of 5-50 μm, a pore size of 0.01-50 μm and a porosity of 10-95%.

According to a twelfth embodiment, there is provided the separator of any one of the first embodiment to the eleventh embodiment, wherein the binder polymer is any one selected from the group consisting of polyvinylidene fluoride-co-hexafluoropropylene, polyvinylidene fluoride-co-trichloro ethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, or a mixture of at least two of them.

In another aspect of the present disclosure, there is also provided the electrochemical devices according to the following embodiments.

According to a thirteenth embodiment, there is provided an electrochemical device including a cathode, an anode and a separator interposed between the cathode and the anode, wherein the separator is the separator as defined in any one of the first embodiment to the twelfth embodiment.

According to a fourteenth embodiment, there is provided an electrochemical device of the thirteenth embodiment, which is a lithium secondary battery.

Advantageous Effects

According to an embodiment of the present disclosure, porous coating layers including boehmite particles and non-boehmite particles as inorganic particles and a binder polymer are formed on both surfaces of a porous substrate with a symmetric structure having the same composition and content, thereby facilitating processing and significantly inhibiting heat shrinking of the porous substrate.

In addition, since the properties of inhibiting heat shrinking of porous coating layers on both surfaces of the porous substrate are the same, the porous substrate does not undergo non-uniformity, such as distortion in any one direction. Thus, it is possible to inhibit a short-circuit between a cathode and an anode even when an electrochemical device is overheated, thereby providing a separator having improved safety and an electrochemical device including the same.

Further, since boehmite particles having relatively low density are used, it is possible to assist weight lightening of a separator and electrochemical device. It is also possible to control a rapid increase in internal temperature of an electrochemical device caused by abnormal operation by virtue of excellent heat-absorbing property of boehmite particles.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The separator according to an embodiment of the present disclosure includes: a porous substrate having a plurality of pores; and a pair of porous coating layers formed on both surfaces of the porous substrate, and including a plurality of inorganic particles and a binder polymer disposed partially or totally on the surface of the inorganic particles to connect and fix the inorganic particles with each other, wherein the amount of the binder polymer and the amount of the inorganic particles in one porous coating layer are the same as those in the other porous coating layer, the hinder polymer is used in an amount of 5-40 wt % based on the total weight of the porous coating layer, the inorganic particles include boehmite particles and non-boehmite particles, and the boehmite particles and the binder polymer are used at a weight ratio of 1:1-1:5.

The separator according to the present disclosure is provided with a pair of porous coating layers having the same content of binder polymer and inorganic particles therein, and thus has a symmetric structure with the porous substrate therebetween.

As compared to the conventional porous substrate having a porous coating layer on either surface thereof, both porous coating layers are bound with the porous substrate so that heat shrinking of the porous substrate caused by an increase in internal temperature may be inhibited significantly.

Moreover, both porous coating layers have the same composition and amounts of binder polymer and inorganic particles to allow for the porous coating layers to provide the same property of inhibiting heat shrinking on the porous substrate. Thus, there is no problem of distortion of the porous substrate in any one direction.

Herein, the binder polymer may be used in an amount of 5-40 wt %, particularly 5-30 wt %, and more particularly 10-30 wt %, based on the total weight of the porous coating layer.

When the binder polymer is used in an amount larger than 40 wt %, an excessive amount of binder polymer is present in the pores of the resultant porous coating layer, thereby reducing the pore size and porosity. When the binder polymer is used in an amount less than 5 wt %, peeling resistance of the porous coating layer is decreased, resulting in degradation of adhesion force.

According to the present disclosure, boehmite particles and non-boehmite particles are used as inorganic particles. As used herein, the term 'non-boehmite particles' refers to inorganic particles other than boehmite particles. The porous coating layer according to the present disclosure includes two different types of inorganic particles, such as boehmite particles and inorganic particles other than boehmite particles.

Boehmite is represented by the chemical formula of AlO(OH) or $Al_2O_3H_2O$ and is a chemically stable alumina monohydrate obtained generally by heat treatment or hydrothermal treatment of alumina trihydrate in the air. Boehmite has a high dehydration temperature of 450-530° C. and may be controlled to have various shapes, including plate-like boehmite, needle-like boehmite and hexangular plate-like boehmite, by adjusting the preparing condition. In addition, it is possible to control the aspect ratio or particle diameter by controlling the preparing condition. Therefore, it is possible to provide various applications with boehmite by using the properties thereof.

In addition, non-limiting examples of non-boehmite particles may include high-dielectric constant inorganic particles having a dielectric constant of 5 or more, particularly 10 or more, inorganic particles capable of transporting lithium ions or a mixture thereof.

Non-limiting examples of the inorganic particles having a dielectric constant of 5 or more include $BaTiO_3$, $Pb(Zr,Ti)O_3$ (PZT), $Pb_{1-x}La_xZr_{1-y}Ti_yO_3$(PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC or a mixture thereof.

As used herein, the term 'inorganic particles capable of transporting lithium ions' refers to inorganic particles which contains a lithium element and functions to transport lithium ions not to store lithium. Non-limiting examples of the inorganic particles capable of transporting lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$-based glass ($Li_xSi_yS_z$, $0<x<3$, $0<y<2$, $0<z<4$) such as $Li_3PO_4$—$Li_2S$—$SiS_2$, $P_2S_5$-based glass ($Li_xP_yS_z$, $0<x<3$, $0<y<3$, $0<z<7$) such as LiI—$Li_2S$—$P_2S_5$, or a mixture thereof. In addition, the boehmite particles and the binder polymer are used at a weight ratio of 1:1-1:5.

When the weight ratio of the boehmite particles to the binder polymer is less than 1:1 (when the content of the binder polymer is decreased), the amount of binder which can bind boehmite particles among themselves or perform binding between boehmite particles and the substrate is insufficient, thereby causing separation. When the weight ratio of the boehmite particles to the binder polymer is larger than 1:5 (when the content of the binder polymer is increased), an excessive amount of binder polymer is present to cause a decrease in pore size and porosity of the porous coating layer and an increase in resistance of the separator, which may result in degradation of the performance of a battery.

According to an embodiment of the present disclosure, the weight ratio of the non-boehmite particles to the boehmite particles may be 1:99-99:1, particularly 40:60-99:1, more particularly 50:50-95:5, even more particularly 50:50-93.3:5, and most particularly 60:40-95:5, or 70:30-95:5, or 85:15-95:5.

When the weight ratio of the non-boehmite particles and the boehmite particles satisfies the above-defined range, it is not required to increase the amount of binder polymer significantly in order to prevent separation of boehmite caused by an increased amount of boehmite. In addition, the dispersion stability or processability of a coating composition for forming a porous coating layer is improved significantly, a porous coating layer having a uniform thickness can be formed, and the porosity of a porous coating layer can be controlled with ease.

The boehmite particles may have an average particle diameter 0.01-0.9 times, particularly 0.015-0.85 times, and more particularly 0.02-0.08 times higher than the average particle diameter of the non-boehmite particles.

According to another embodiment of the present disclosure, the non-boehmite particles may have an average particle diameter of 0.5-3 µm, particularly 0.7-2.7 µm, and more particularly 0.9-2.5 µm, while the boehmite particles may have an average particle diameter of 0.05-0.4 µm, particularly 0.07-0.37 µm, and more particularly 0.09-0.35 µm.

According to still another embodiment, the inorganic particles may include non-boehmite particles having an average particle diameter different from the average particle diameter of boehmite particles. Therefore, the dispersibility and coating processability of the inorganic particles in a composition for forming a porous coating layer are improved, controlling of the thickness of a coating layer is facilitated, and degradation of mechanical properties and electrical properties can be improved. In addition, since particles with a smaller particle diameter may be positioned in large pores formed between particles with a larger particle diameter, it is possible to control the size of pores of the resultant porous coating layer. It is also possible to prevent an internal short-circuit during charging and discharging of a battery by improving the density of the porous coating layer and inhibiting a heat shrinking phenomenon of the porous substrate.

Particularly, according to still another embodiment, non-boehmite particles are used in combination with boehmite particles having a smaller particle diameter as compared to the non-boehmite particles. Thus, it is possible to obtain more advantageous effects as described hereinafter, when compared to the use of the same type of inorganic particles merely different in terms of particle size.

For example, when the non-boehmite particles are alumina particles, alumina particles are compounds of aluminum and oxygen which have a chemical formula of $Al_2O_3$ and are known as electric insulators having relatively high heat conductivity and a density of 3.95-4.1 g/cm³.

Meanwhile, the boehmite particles generally have a density of about 2.4-3.1 g/cm³.

In addition, boehmite particles have excellent heat-absorbing property and contain hydroxyl groups to provide high hydrophilicity and to be controlled to have a high specific surface area. Thus, boehmite particles can function as carriers provided with additives useful for electrochemical devices. Further, boehmite has a heat conductivity similar to the heat conductivity of alumina and thus is useful as a heat conductive filler. Particularly, boehmite having a high aspect ratio shows anisotropy, and thus can provide increased heat conductivity in a predetermined direction even when it is added in a small amount. Thus, when an abnormal temperature increase occurs in an electrochemical device, boehmite can transfer heat to the outside by virtue of its high heat conductivity.

Therefore, when the porous coating layer according to the present disclosure uses alumina particles, which are non-boehmite particles, as larger-particle diameter inorganic particles, in combination with boehmite particles having a smaller average particle diameter and a relatively smaller density as compared to the alumina particles, it is possible to reduce the total weight of a separator and to assist weight lightening of an electrochemical device. In addition, as described above, boehmite particles can be realized as various shapes, such as a plate-like shape, other than a spherical shape. Thus, even when spherical alumina particles are arranged while being adjacent to each other or being spaced apart significantly from each other, boehmite particles can be disposed easily in various shapes of pores among the alumina particles. As a result, it is possible to improve the density and mechanical properties of a porous coating layer significantly and to inhibit heat shrinking of a porous substrate, and thus to prevent an internal short-circuit of an electrochemical device.

For example, when using alumina particles having different average particle diameters, or larger-particle diameter alumina particles and smaller-particle diameter alumina particles, smaller-particle diameter alumina particles are problematic in that they are significantly expensive and are difficult to handle as compared to larger-particle alumina particles. However, according to an embodiment of the present disclosure, alumina particles are used in combination with boehmite particles having a smaller average particle diameter than that of alumina particles. Therefore, it is possible to overcome the above-mentioned problem.

The porous substrate may be a porous polymer substrate, particularly a porous polymer film substrate or porous polymer non-woven web substrate.

The porous polymer film substrate may include a porous polymer film including a polyolefin, such as polyethylene or polypropylene. For example, such a polyolefin porous polymer film substrate realizes a shut-down function at a temperature of 80-130° C.

Herein, the polyolefin porous polymer film may include a polymer formed of polyethylene, such as high-density polyethylene, linear low-density polyethylene, low-density polyethylene and ultrahigh-molecular weight polyethylene, polypropylene, polybutylene and polypentene alone or in combination.

In addition, the porous polymer film substrate may be prepared by using various polymers, such as polyesters, in addition to polyolefins and forming the polymers into a film shape. The porous polymer film substrate may be formed to have a stacked structure of two or more film layers, wherein each film layer may include the abovementioned polymers, such as polyolefins and polyesters, alone or in combination.

In addition to the above-mentioned polyolefins, the porous polymer film substrate and the porous non-woven web substrate may include polyethylene terephthalate, polybutylene terephthalate, polyester, polyacetal, polyamide, polycarbonate, polyimide, polyether ether ketone, polyether sulfone, polyphenylene oxide, polyether sulfone, polyphenylene oxide, polyphenylene sulfide, polyethylene naphthalene, or the like, alone or in combination.

Although there is no particular limitation in the thickness of the porous substrate, the porous substrate may have a thickness of 1-100 μm, particularly 5-50 μm. Although the pore size and porosity of the pores present in the porous substrate are not also limited particularly, it is preferred that the pore size and porosity are 0.01-50 μm and 10-95%, respectively.

In the separator according to an embodiment of the present disclosure, the binder polymer used for forming the porous coating layer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with each other, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than $45^{1/2}$, it is difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloro ethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose.

Besides the above-mentioned inorganic particles and polymer, the separator according to an embodiment of the present disclosure may further include other additives as ingredients for the porous coating layer.

The separator according to an embodiment of the present disclosure may be obtained by preparing a composition for forming a porous coating layer which includes inorganic particles including boehmite particles and non-boehmite particles other than the boehmite particles, and a binder polymer, and then applying the composition onto both surfaces of a porous substrate, followed by drying.

First, the composition for forming a porous coating layer may be obtained by dissolving a binder polymer into a solvent, adding inorganic particles thereto and dispersing them. The inorganic particles may be added after they are pulverized in advance to a predetermined average particle diameter. Otherwise, the inorganic particles may be added to a binder polymer solution, and then pulverized and dispersed while controlling them to have a predetermined average particle diameter by using a ball milling process, or the like.

Although there is no particular limitation in the process for coating the composition for forming a porous coating layer onto the porous substrate, it is preferred to use a slot coating or dip coating process. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous substrate coated with the composition for forming a porous coating layer is dried by using a dryer, such as an oven, thereby forming porous coating layers having a symmetric structure on both surfaces of the porous substrate.

In the porous coating layers, the inorganic particles are bound among themselves by the binder polymer while they are packed and are in contact with each other. Thus, interstitial volumes are formed among the inorganic particles and the interstitial volumes become vacant spaces to form pores.

In other words, the binder polymer attaches the inorganic particles to each other so that they may retain their binding states. For example, the binder polymer connects and fixes the inorganic particles with each other. In addition, the pores of the porous coating layer are those formed by the interstitial volumes among the inorganic particles which become vacant spaces. The space is defined by the inorganic particles facing each other substantially in a closely packed or densely packed structure of the inorganic particles.

The electrochemical device according to another aspect of the present disclosure includes a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors such as super capacitor devices. Particularly, among the secondary batteries, lithium secondary batteries, including lithium metal secondary batteries, lithium ion secondary batteries, lithium polymer secondary batteries or lithium ion polymer ion batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (g-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

Polyvinylidene fluoride-co-hexafluoroproyplene (PVdF)-HFP as a binder was added to acetone and dissolved therein at 50° C. for about 12 hours or more to prepare a binder polymer solution. To the resultant binder polymer solution, alumina ($Al_2O_3$) particles having an average particle diameter of 500 nm as non-boehmite particles were added in combination with boehmite (γ-ALO(OH)) particles having an average particle diameter of 200 nm and then dispersed therein to obtain a slurry for a porous coating layer.

The obtained slurry was coated onto both surfaces of a polyethylene porous membrane (porosity 40%) having a thickness of 9 μm through a dip coating process to obtain a separator provided with porous coating layers on both surfaces thereof.

Referring to the resultant separator, the content of the binder polymer and weight ratio of the boehmite particles to the binder polymer in the two porous coating layers (also called a first porous coating layer and a second porous coating layer) formed on both surfaces of the polyethylene porous membrane, and the thickness of the separator are shown in the following Table 1. Herein, since the whole porous coating layer includes alumina particles, boehmite particles and the binder polymer, it is possible to calculate the weight % of alumina particles from the formula of 100−(wt % of binder polymer+wt % of boehmite particles). Therefore, it can be seen that the weight ratio of alumina particles:boehmite particles:binder polymer is 92.5:2.5:5. Similarly, in Examples 2-10 and Comparative Examples 1-11, it is possible to calculate the weight % of alumina particles and the weight ratio of alumina particles:boehmite particles:binder polymer in the same manner as mentioned above.

Examples 2-10

Separators were obtained in the same manner as Example 1, except that the weight of the binder polymer, weight ratio of the boehmite particles to the binder polymer and the thickness of a separator were set according to the following Table 1.

Comparative Example 1

Polyvinylidene fluoride-co-hexafluoroproyplene (PVdF)-HFP as a binder was added to acetone and dissolved therein at 50° C. for about 12 hours or more to prepare a binder polymer solution. To the resultant binder polymer solution, alumina ($Al_2O_3$) particles having an average particle diameter of 500 nm were added as inorganic particles and then dispersed therein to obtain a slurry for a porous coating layer.

The obtained slurry was coated onto both surfaces of a polyethylene porous membrane (porosity 40%) having a thickness of 9 μm through a dip coating process to obtain a separator provided with porous coating layers on both surfaces thereof.

Referring to the resultant separator, the content of the binder polymer and weight ratio of the boehmite particles to the binder polymer in the two porous coating layers (also called a first porous coating layer and a second porous coating layer) formed on both surfaces of the polyethylene porous membrane, and the thickness of the separator are shown in the following Table 1.

Comparative Example 2

A separator was obtained in the same manner as Example 1, except that the weight of the binder polymer and weight ratio of the boehmite particles to the binder polymer in the two porous coating layers (also called a first porous coating layer and a second porous coating layer) formed on both surfaces of the polyethylene porous membrane, and the thickness of the separator were set according to the following Table 1.

Comparative Example 3

A separator was obtained in the same manner as Comparative Example 1, except that the weight of the binder polymer in the two porous coating layers (also called a first porous coating layer and a second porous coating layer) formed on both surfaces of the polyethylene porous membrane was set according to the following Table 1.

Comparative Example 4

A separator was obtained in the same manner as Example 1, except that the weight of the binder polymer and weight ratio of the boehmite particles to the binder polymer in the two porous coating layers (also called a first porous coating layer and a second porous coating layer) formed on both surfaces of the polyethylene porous membrane were set according to the following Table 1.

Comparative Example 5

A separator was obtained in the same manner as Comparative Example 1, except that the weight of the binder polymer in the two porous coating layers (also called a first porous coating layer and a second porous coating layer) formed on both surfaces of the polyethylene porous membrane, and the thickness of the separator were set according to the following Table 1.

Comparative Examples 6-11

Separators were obtained in the same manner as Example 1, except that the weight of the binder polymer and weight ratio of the boehmite particles to the binder polymer in the two porous coating layers (also called a first porous coating layer and a second porous coating layer) formed on both surfaces of the polyethylene porous membrane, and the thickness of the separator were set according to the following Table 1.

Evaluation for Physical Properties of Separators

The separators obtained according to Examples 1-10 and Comparative Examples 1-11 were determined for air permeation time and heat shrinkage. The results are shown in the following Table 1.

(1) Air Permeation Time

Gurley air permeability values were determined according to the method of ASTM D726-94. Gurley used herein is resistance against air flow and is measured by a Gurley densometer. The Gurley air permeability value described herein is shown as time (seconds) required for 100 mL of air to pass through a section of 1 $in^2$ under a pressure of 12.2 in $H_2O$, i.e., air permeation time.

(2) Heat Shrinkage

Each of the separators obtained according to Example 1 and Comparative Example 1 was cut into a size of 50 mm×50 mm, placed between A4 paper sheets, introduced to a convection oven at 150° C. for 30 minutes, and then its heat shrinkage was measured in the machine direction (MD) and transverse direction (TD). Herein, heat shrinkage was calculated by the formula of [(initial length−length after heat treatment)/(initial length)×100].

TABLE 1

| | First porous coating layer | | Second porous coating layer | | | Results of evaluation for physical properties | |
|---|---|---|---|---|---|---|---|
| | Weight of binder polymer based on total weight of porous coating layer (wt %) | (Boehmite particle):(binder polymer) (weight ratio) | Weight of binder polymer based on total weight of porous coating layer (wt %) | (Boehmite particle):(binder polymer) (weight ratio) | Thickness of separator (μm) | Air permeation time (Gurley) (s/100 mL) | Heat shrinkage (MD/TD) (%) 150° C., 30 minutes |
| Ex. 1 | 5 | 2.5:5 | 5 | 2.5:5 | 13.5 | 423 | 14/14 |
| Ex. 2 | 5 | 1.7:5 | 5 | 1.7:5 | 13.7 | 435 | 18/18 |
| Ex. 3 | 10 | 5:10 | 10 | 5:10 | 13.5 | 417 | 10/10 |
| Ex. 4 | 10 | 3.4:10 | 10 | 3.4:10 | 13.7 | 418 | 13/12 |
| Ex. 5 | 15 | 7.5:15 | 15 | 7.5:15 | 13.2 | 388 | 8/8 |

TABLE 1-continued

|  | First porous coating layer | | Second porous coating layer | | | Results of evaluation for physical properties | |
| --- | --- | --- | --- | --- | --- | --- | --- |
|  | Weight of binder polymer based on total weight of porous coating layer (wt %) | (Boehmite particle):(binder polymer) (weight ratio) | Weight of binder polymer based on total weight of porous coating layer (wt %) | (Boehmite particle):(binder polymer) (weight ratio) | Thickness of separator (μm) | Air permeation time (Gurley) (s/100 mL) | Heat shrinkage (MD/TD) (%) 150° C., 30 minutes |
| Ex. 6 | 15 | 5:15 | 15 | 5:15 | 13.4 | 402 | 10/9 |
| Ex. 7 | 20 | 20:40 | 20 | 20:40 | 13.1 | 380 | 6/6 |
| Ex. 8 | 20 | 6.8:20 | 20 | 6.8:20 | 13.3 | 391 | 9/9 |
| Ex. 9 | 40 | 20:40 | 40 | 20:40 | 13.4 | 413 | 13/11 |
| Ex. 10 | 30 | 15:30 | 30 | 15:30 | 13.5 | 388 | 12/12 |
| Comp. Ex. 1 | 3 | — | 7 | — | 14.1 | 581 | 56/54 |
| Comp. Ex. 2 | 3 | 1.5:3 | 7 | 1.5:3 | 13.9 | 570 | 46/44 |
| Comp. Ex. 3 | 1.5 | — | 1.5 | — | 13.7 | 558 | 40/38 |
| Comp. Ex. 4 | 1.5 | 0.75:1.5 | 1.5 | 0.75:1.5 | 13.7 | 536 | 31/30 |
| Comp. Ex. 5 | 5 | — | 5 | — | 13.8 | 544 | 36/34 |
| Comp. Ex. 6 | 42 | 21:42 | 42 | 21:42 | 14.5 | 603 | 48/46 |
| Comp. Ex. 7 | 45 | 22.5:45 | 45 | 22.5:45 | 14.3 | 610 | 48/48 |
| Comp. Ex. 8 | 5 | 6.25:5 | 5 | 6.25:5 | 14.0 | 590 | 32/30 |
| Comp. Ex. 9 | 40 | 50:40 | 40 | 50:40 | 14.1 | 598 | 40/36 |
| Comp. Ex. 10 | 5 | 0.96:5 | 5 | 0.96:5 | 14.2 | 620 | 34/30 |
| Comp. Ex. 11 | 40 | 7.7:40 | 40 | 7.7:40 | 15.1 | 658 | 64/58 |

Referring to Table 1, the separators obtained according to Examples 1-10 satisfy the conditions that the amount of the binder polymer is 5-40 wt % based on the total weight of the porous coating layer and the weight ratio of the boehmite particles to the binder polymer is 1:1-1:5. As a result, it can be seen that each of Examples 1-10 shows an air permeation time and heat shrinkage improved significantly as compared to the separators according to Comparative Examples 1-11.

Particularly, since the average particle diameter of boehmite particles is smaller than that of alumina particles, boehmite particles have a large surface area. Thus, even when using boehmite particles in the same amount as alumina particles, it is difficult to disperse the slurry.

In the case of Comparative Example 8, an excessive amount of boehmite particles is used as compared to Examples 1 and 2. Thus, the amount of the binder polymer configured to bind the inorganic particles sufficiently to each other is insufficient to cause agglomeration of inorganic particles, thereby making it difficult to disperse the slurry and providing the slurry with poor coatability. In general, as the amount of inorganic particles is increased, heat shrinkage may be improved. However, in this case, a problem of degradation of heat shrinkage occurs due to such a poor slurry dispersion state. As a result, the separator according to Comparative Example 8 shows an air permeability and heat shrinkage decreased significantly as compared to Examples 1 and 2.

Meanwhile, as compared to the separators according to Examples 1 and 2, the separator according to Comparative Example 8 has an excessive amount of boehmite particles, resulting in significant degradation of dispersion stability of the slurry and coatability. Thus, the heat shrinkage and air permeability are degraded. In the case of Comparative Example 10, since an excessive amount of binder polymer is used as compared to boehmite particles, the binder polymer is present in a large amount on the surface of the porous coating layers of the separator due to phase separation during the slurry drying step, thereby forming a kind of membrane. As a result, the membrane blocks the pores of the porous coating layer, resulting in significant degradation of air permeability.

In addition, when compared Example 9 to Comparative Examples 9 and 11, Comparative Example 9 uses an excessive amount of boehmite particles as compared to Example 9, and thus shows poor dispersibility of inorganic particles including boehmite particles, resulting in a problem of slurry phase stability. Due to this, the slurry cannot be coated well on the porous substrate, thereby causing degradation of the physical properties of the resultant separator. In the case of Comparative Example 11, the binder polymer is used in an excessive amount as compared to boehmite particles. Thus, the binder polymer is present in a large amount on the surface of the porous coating layers of the separator after coating and blocks the pores of the porous coating layer, resulting in degradation of air permeability and heat shrinkage.

What is claimed is:
1. A separator comprising:
a porous substrate having a plurality of pores; and
a pair of porous coating layers formed on both surfaces of the porous substrate, and including a plurality of inorganic particles and a binder polymer disposed partially or totally on the surface of the inorganic particles to connect and fix the inorganic particles with each other, wherein the amount of the binder polymer and the amount of the inorganic particles in one porous coating layer are the same as those in the other porous coating layer, the binder polymer is used in an amount of 5-40 wt % based on the total weight of the porous coating layer, the inorganic particles include boehmite particles and non-boehmite particles, wherein a weight % of non-boehmite particles to boehmite particles is 40:20 to 93.3:1.7, and the boehmite particles and the binder polymer are used at a weight ratio of 1:2 to 1:3, wherein the binder polymer is polyvinylidene fluoride-co-hexafluoropropylene, wherein the non-boehmite particles are $Al_2O_3$, and wherein the separator comprising the pair of porous coating layers has a thickness of 13.1-13.7 μm.

2. The separator according to claim 1, wherein the boehmite particles have an average particle diameter 0.01-0.9 times higher than the average particle diameter of the non-boehmite particles.

3. The separator according to claim 1, wherein the non-boehmite particles have an average particle diameter of 0.5-3 μm.

4. The separator according to claim 1, wherein the boehmite particles have an average particle diameter of 0.05-0.4 μm.

5. The separator according to claim 1, wherein the porous substrate is a polyolefin-based porous substrate.

6. The separator according to claim 5, wherein the polyolefin-based porous substrate comprises any one polymer selected from the group consisting of polyethylene, polypropylene, polybutylene and polypentene, or a combination thereof.

7. The separator according to claim 1, wherein the porous substrate has a porosity of 40%.

8. An electrochemical device comprising a cathode, an anode and a separator interposed between the cathode and the anode, wherein the separator is the separator as defined in claim 1.

9. The electrochemical device according to claim 8, which is a lithium secondary battery.

* * * * *